US011064264B2

(12) United States Patent
 Latham et al.

(10) Patent No.: US 11,064,264 B2
(45) Date of Patent: Jul. 13, 2021

(54) INTELLIGENT REWIND FUNCTION WHEN PLAYING MEDIA CONTENT

(71) Applicant: International Business Machines Corporation, Armonk, NY (US)

(72) Inventors: Thomas Latham, Eastleigh (GB); Jack Dunning, Lyndhurst (GB); Jordan Cain, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/136,695

(22) Filed: Sep. 20, 2018

(65) Prior Publication Data

US 2020/0099994 A1  Mar. 26, 2020

(51) Int. Cl.
*H04N 21/6587* (2011.01)
*H04N 21/845* (2011.01)
*H04N 21/488* (2011.01)
*G06F 3/16* (2006.01)
*G06K 9/00* (2006.01)

(52) U.S. Cl.
CPC ......... *H04N 21/6587* (2013.01); *G06F 3/165* (2013.01); *G06K 9/00711* (2013.01); *H04N 21/4884* (2013.01); *H04N 21/8456* (2013.01); *G06K 2009/00738* (2013.01)

(58) Field of Classification Search
None
See application file for complete search history.

(56) References Cited

U.S. PATENT DOCUMENTS

| 7,885,519 | B2 |  | 2/2011 | Pawlowski |  |
|---|---|---|---|---|---|
| 9,274,673 | B2 |  | 3/2016 | Stout |  |
| 9,852,773 | B1 | * | 12/2017 | Salvador | G11B 27/22 |
| 2002/0101537 | A1 | * | 8/2002 | Basson | H04N 5/445 |
|  |  |  |  |  | 348/465 |
| 2004/0179817 | A1 | * | 9/2004 | Chou | G11B 27/105 |
|  |  |  |  |  | 386/241 |
| 2004/0252979 | A1 | * | 12/2004 | Momosaki | H04N 5/60 |
|  |  |  |  |  | 386/244 |

(Continued)

FOREIGN PATENT DOCUMENTS

| TW | 200537941 A | 11/2005 |
|---|---|---|
| WO | 2007113580 | 10/2007 |

OTHER PUBLICATIONS

Unknown, "Method for jumping locations in video playback through user selection," ip.com, ip.com Disclosure No. IPCOM000193602D, Original Publication Date: Mar. 5, 2010, Included in the Prior Art Database: Mar. 5, 2010, 3 pages.

(Continued)

*Primary Examiner* — Ricky Chin
(74) *Attorney, Agent, or Firm* — Peter Edwards

(57) ABSTRACT

A computer-implemented method, system, and computer program product to perform an intelligent rewind function includes: identifying one or more events that occur during playback of media content; identifying an interrupt event in the one or more events, where the interrupt event is an event that is estimated to be disruptive to a user consuming the media content; locating an event time on a timeline of the media content, where the event time is associated with the interrupt event; and reverting the media content to a rewind time in the timeline, where the rewind time is associated with the event time.

20 Claims, 14 Drawing Sheets

(56) References Cited

U.S. PATENT DOCUMENTS

| | | | |
|---|---|---|---|
| 2005/0038661 A1* | 2/2005 | Momosaki | H04N 21/4394 |
| | | | 704/275 |
| 2007/0143820 A1 | 6/2007 | Pawlowski | |
| 2008/0170155 A1* | 7/2008 | Cooper | H04N 5/44513 |
| | | | 348/564 |
| 2008/0279535 A1* | 11/2008 | Haque | H04N 21/2355 |
| | | | 386/244 |
| 2013/0117248 A1* | 5/2013 | Bhogal | G11B 27/105 |
| | | | 707/705 |
| 2016/0014476 A1* | 1/2016 | Caliendo, Jr. | H04N 21/4396 |
| | | | 725/32 |
| 2016/0100210 A1* | 4/2016 | Choe | H04N 21/4307 |
| | | | 386/234 |
| 2016/0198229 A1* | 7/2016 | Keipert | H04N 21/4325 |
| | | | 725/12 |
| 2017/0223413 A1* | 8/2017 | Kozloski | H04N 21/252 |

OTHER PUBLICATIONS

Unknown, Interference Detection and Response for Media Playback, ip.com, ip.com Disclosure No. IPCOM000187587D, Original Publication Date: Sep. 11, 2009, Included in the Prior Art Database: Sep. 11, 2009, 2 pages.

WAHAB, "How to Fast Forward & Rewind a YouTube Video by Ten Seconds [Android]," AddictiveTips, Dec. 21, 2016, 10 pages.

Mell, et al., "The NIST Definition of Cloud Computing," Recommendations of the National Institute of Standards and Technology, U.S. Department of Commerce, Special Publication 800-145, Sep. 2011, 7 pages.

\* cited by examiner

INTELLIGENT REWIND FUNCTION WHEN PLAYING MEDIA CONTENT

BACKGROUND

The present disclosure relates to media content and playing a stream of media content that contains speech, and more particularly to an intelligent rewind function.

SUMMARY

The present invention provides a computer-implemented method, system, and computer program product to perform an intelligent rewind function. The method may include identifying one or more events that occur during playback of media content. The method may also include identifying an interrupt event in the one or more events, where the interrupt event is an event that is estimated to be disruptive to a user consuming the media content. The method may also include locating an event time on a timeline of the media content, where the event time is associated with the interrupt event. The method may also include reverting the media content to a rewind time in the timeline, where the rewind time is associated with the event time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
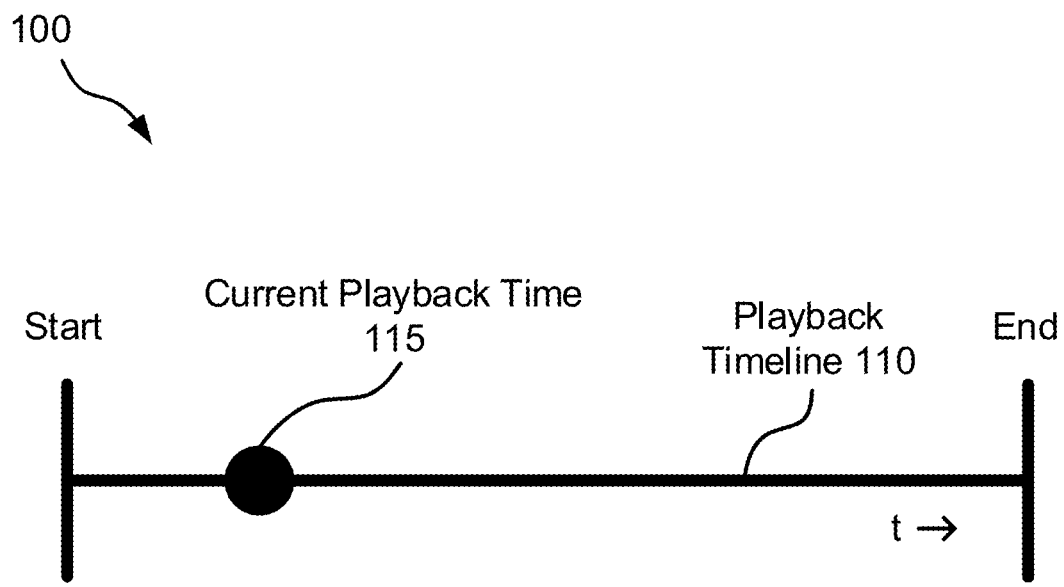
FIG. 1 depicts a schematic diagram of a playback timeline for playing media content, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to media content and playing a stream of media content that contains speech, and more particularly to an intelligent rewind function. While the present disclosure is not necessarily limited to such applications, various aspects of the disclosure may be appreciated through a discussion of various examples using this context.

A common problem when playing media content (e.g., streaming media, movies or film, television media, etc.) occurs when a viewer experiences an interruption (e.g., by someone or something) while viewing the media content. Insofar as it is consistent with the embodiments of this disclosure, media content may include any type of video content (e.g., movies or film, television, streaming media). Example interruptions may include a phone call received in the vicinity of the media content display, a viewer talking while the media content is being viewed, a notification (e.g., a text box, image, banner, etc. that displays information or alerts) displayed over the media content, or any other event or action that may disrupt the viewing experience for a viewer. For example, a user may be streaming a TV show on their cell phone, and while streaming the TV show, gets a text message. In this example, the user may be informed of the text message via a notification with text displayed at the top of the screen, partially covering the TV show. After the interruption is over, the viewer may have to rewind the media content on a media player device to find the time of the media content when the interruption occurred. In some embodiments, the time of the media content may be represented in a timestamp, or a sequence of characters identifying a specific time (e.g., 01:38:05 representing 1 hour, 38 minutes, and 5 seconds into a movie). For example, an interruption may begin 30 minutes into a movie (i.e., at timestamp 00:30:00 of the movie), and the interruption may end 45 minutes into the movie (i.e., at timestamp 00:45:00). In this example, once the interruption ends at 45 minutes into the movie, the viewer may have to rewind the movie back 15 minutes (i.e., back to timestamp 00:30:00) in order to return to the time of the movie before the interruption occurred.

In some embodiments, a media player device is a device that includes a processor and that processes media content. Example media player devices may include DVD or movie players, gaming systems, streaming devices, third party processors or devices, or any other devices that can play media content. In some embodiments, the media player device may include a display for displaying the media content. In some embodiments, the media player device may be separate from but connected to (i.e., wired connection or wireless connection) a display that displays the media content. For example, the media player device may be a DVD player and the DVD player may be connected to a TV in order to display the media content. In some embodiments, a display device or the media player device may include an application running on the device. For example, a tablet may run a streaming service application to connect to a server for the streaming service in order to receive a TV show for display. The server for the streaming service may send a file of the TV show to the tablet, and the tablet may decode and display the file. In some embodiments, the media player device (or a display device communicating with the media player device) may be operable to run multiple applications simultaneously, and the media content may be displayed through one such application.

When rewinding media content after an interruption occurs, some media player devices (e.g., DVD or movie players, television, set top box, etc.), for example, may have a corresponding remote controller that includes a rewind button, giving viewers the capability to rewind the media content once the interruption, or disruption, is over. In some embodiments, a rewind button may be embedded in a display of the media content (e.g., a graphical user interface (GUI)). For example, a viewer may rewind the media content by selecting a rewind button, or symbol, on a display screen of a tablet. In another example, a viewer may rewind the media content by dragging a cursor along a time bar displayed on a video window of a computer device. In this example, selecting the rewind button may be the action of dragging the cursor. In some instances, a rewind button may rewind the media content in intervals, such that each selection of the rewind button rewinds the media content by a set amount of time (e.g., 5 seconds, 10 seconds, 30 seconds, etc.). These example media player devices and rewind buttons may also be operable with a voice command, which may include a rewind command.

In these example rewind actions, it is often difficult to accurately and precisely locate the time of interruption. The viewer may have to execute a few iterations of rewind and fast-forward commands before finding the correct time of interruption, which is time consuming for the viewer and may also overwork the media player or media player device. Moreover, in personal computers, tablets, smartphones, etc., it may not be straightforward to access the display (e.g., GUI) to select the rewind button. For example, accessing the display may involve turning on a controller, unlocking a display device from a sleep mode, switching from a different application running on the same display device simultaneously, etc.

The present disclosure provides a computer-implemented method, system, and computer program product for performing an intelligent rewind function. In some embodiments, the intelligent rewind function, when executed, automatically rewinds or reverts to a time before an interruption, or disruption, occurred.

In some instances, the media player device, or another computer device (e.g., a display device, or any other device connected to the media player device), may automatically detect the start and end of the interruption. For example, the media player device may have microphones or some type of sound detection that can detect an increased amount of noise and identify that increased noise as an interruption. In some examples, the media player device may detect a notification that is displayed on the display device, such as when a notification (e.g., text box) disrupts the view of the media content, and may identify the start and end of the displayed alert as the start and end of the interruption. Once the interruption has ended, the media player device may automatically execute the intelligent rewind function after detecting the end of the interruption.

In some embodiments, the media player device may receive a command to execute the rewind function. For example, the media player device, or another device connected to the media player device, may listen for and detect a voice command from a viewer of the media content that instructs the media player device to execute the rewind function. In some examples, the media player device may receive a command to execute the rewind function from the viewer via a button or selection (e.g., on the media player device, a computer device, a remote controller, etc.).

Referring now to FIG. 1, a schematic diagram 100 of a playback timeline for playing media content is depicted, according to some embodiments. In some embodiments, playback timeline 110 is a timeline corresponding to the media content. For example, a display device (or the media player device) may provide some type of timeline display (e.g., at the bottom of the display of the media content) indicating times (e.g., timestamps, movie chapters) correlating to the media content. The times shown on the timeline display may include a current time of the media content (e.g., the time that has passed from the start of the movie), a start time of the media content, an end time of the media content, and/or a remaining time of the media content (e.g., the time between the current time of the movie to the end time of the movie).

Playback timeline 110 includes a start and an end of the timeline (e.g., a start and an end of the media content) and a current playback time 115. In the example illustrated by FIG. 1, the current playback time 115 is the current time of the media content. In schematic diagram 100, the current playback position (e.g., current playback time 115) is partway along playback timeline 110 (i.e., somewhere in between the start and end of the playback timeline 110). This may represent, for example, a movie having been watched part way through or a television show that a viewer has started watching but has not finished yet.

Times on a timeline, as referred to herein, may include any locations or positions on the timeline. For example, a timeline may display movie chapters (e.g., scenes) and each chapter may be a time on the timeline.

In some embodiments, playback timeline 110 is a timeline for playback of a video file on a display of the video file. In some embodiments, the video file may include both video content and audio content. In some embodiments, the video file may support the display of subtitles during playback, for example through an option that the viewer (or user) can switch on and off through a settings menu. In some embodiments, subtitles may be text and/or symbols that transcribe the sounds of the media content. Subtitles may be supported by including a series of subtitle entries stored with the video file (referred to herein as a subtitle file), or in other cases (e.g., for a live television feed, etc.) subtitle entries may be determined continuously throughout the media content using a speech decoder. In some embodiments, each subtitle entry may be assigned a subtitle range. A subtitle range may be an amount of time that the subtitle is displayed on the media content. For example, a subtitle entry may correspond to a scene in a movie, such as a conversation between characters. The subtitle entry may have a subtitle range that is the length of the scene, or chapter, of the movie. In some embodiments, the subtitle range may include a range between two particular timestamps, such as a start time and an end time.

Figure 2:
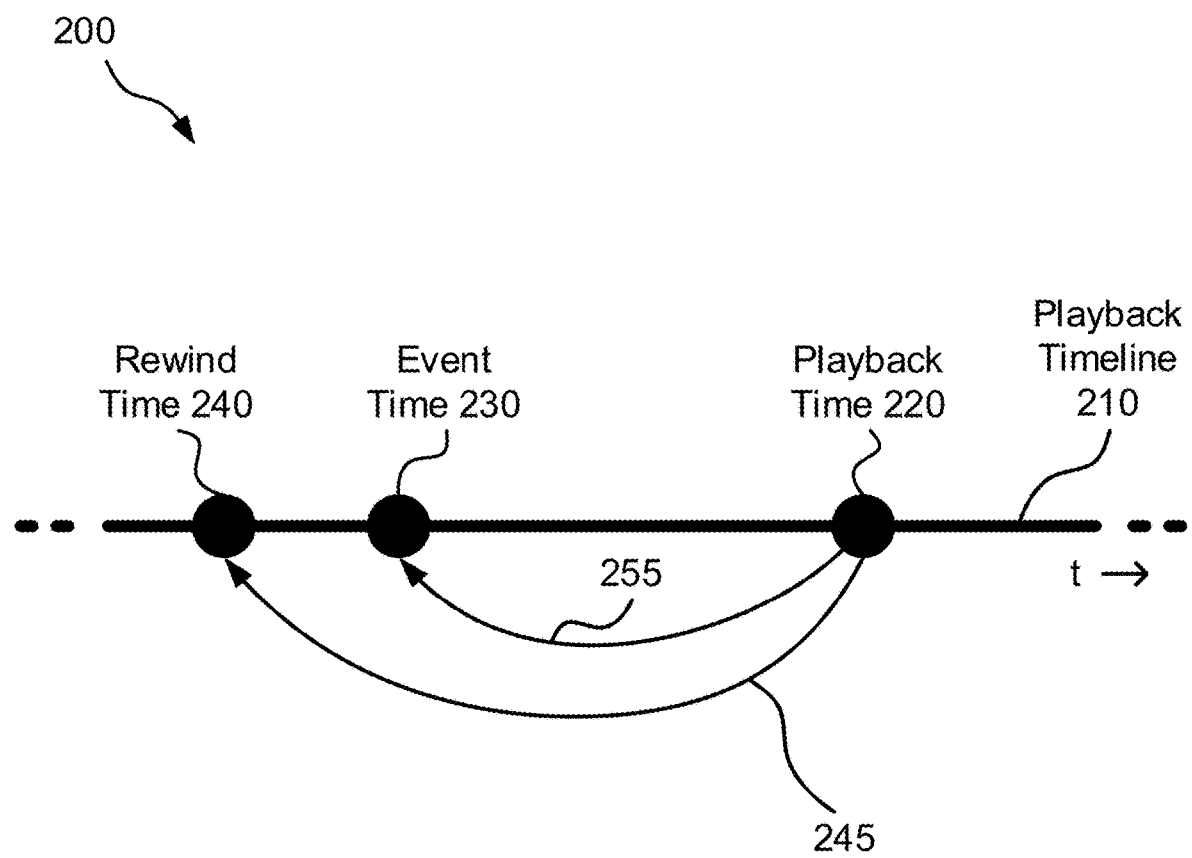
FIG. 2 depicts a schematic representation of an intelligent rewind function on a playback timeline, according to some embodiments.

Referring to FIG. 2, a schematic representation of an intelligent rewind function 200 on a playback timeline is depicted, according to some embodiments. The intelligent rewind function 200 is depicted on playback timeline 210. In the depiction, only a part of playback timeline 210 is shown. In some embodiments, playback timeline 210 is a timeline similar to playback timeline 110 (FIG. 1).

Playback timeline 210 includes playback time 220, event time 230, and rewind time 240. In some embodiments, event time 230 is the time of interruption. In some embodiments, event time 230 is a time, or location, on playback timeline 210 corresponding to a timestamp of the time of interruption. The interruption, as discussed herein, may also be referred to as an interrupt event. Playback time 220, may be a time after the interruption has concluded, or a time at which the viewer may be ready to resume viewing the media content. In some embodiments, playback time 220 may be a time when a rewind command is received by the media player device. In some embodiments, playback time 220 may be a time when the media player device detects that the interruption has ended. Rewind time 240 may be a time the media content is rewound to, or reverted to, after the interrupt event has occurred. In some embodiments, rewind time 240 is the same as event time 230, in other words the media content may be rewound to, or reverted to, the time of interruption.

In some embodiments, when rewind function 200 is executed, the media player device may search for a suitable recent event, or a time near the suitable recent event, to revert to. A suitable recent event may be an event that is, or was, potentially disruptive to the user's (or viewer's) consumption of the media content. The media player device may be notified about such potentially disruptive events, either with internal notifications or external notifications (e.g., the notifications are generated by components of the media player device or received at an input of the media player device from a separate device). In some embodiments, the media player device may include an event receiver for receiving notifications of events that occur during playback of the media content which are potentially disruptive to the user's viewing of the media content.

In some embodiments, an event may be determined to be disruptive to the user's viewing, or consumption, of the media content, and may be selected for reversion. The selected disruptive event may be referred to as an interrupt event. The time (i.e., on the playback timeline 210) the interrupt event occurred may be referred to as the event time. Event time 230 shows the time of the interrupt event which has been selected for reversion. This selection is described in more detail below. In some embodiments, the media player device reverts 255 to the event time 230. In some embodiments, instead of reverting to the event time 230 of the disruptive event, the media player device may revert 245 the media content a little further, to rewind time 240. Reverting to the rewind time 240 may be beneficial for the viewer and may assist the user in recalling what happened, or what occurred, within the media content before the interrupt event.

Figure 3:
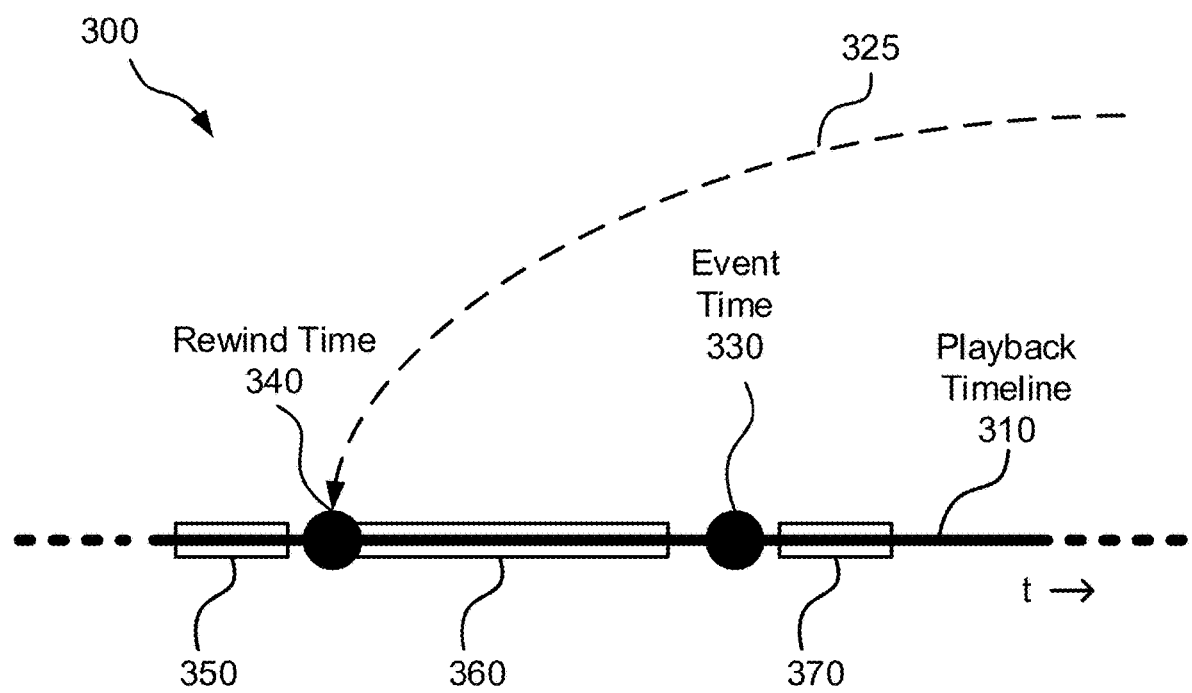
FIG. 3 depicts a schematic representation of an example revert action using an intelligent rewind function, according to some embodiments.

Referring to FIG. 3, a schematic representation of an example rewind function 300 is depicted, according to some embodiments. In some embodiments, rewind function 300 is a closer up, or zoomed in, version of rewind function 200 (FIG. 2). Rewind function 300 is depicted on playback timeline 310. Playback timeline 310 includes event time 330 and rewind time 340. In some embodiments, event time 330 may be the time of the interrupt event, or interruption. In the embodiments associated with this illustration, the rewind function reverts back to rewind time 340. However, in some embodiments, a rewind function may revert back to the time of the interrupt event (e.g., event time 330).

In some embodiments, media content is provided with subtitle files, for example when video files of the media content support the display of subtitles during playback. In some embodiments, a subtitle file may contain one or more subtitle entries, and each subtitle entry may contain a plurality of subtitles. In some instances, the subtitles may be displayed with the media content on the media player device or media player. In some instances, the media content may correspond to subtitle files, and the subtitle files may be provided to the media player device, but the media content is displayed with no subtitles.

In some embodiments, subtitle files, and subtitle entries, may be used to determine the rewind time 340. Each subtitle entry may have a time range (i.e., subtitle range) that corresponds to the subtitle entry. Subtitle range 350, subtitle range 360, and subtitle range 370 are example time ranges for subtitle files that may correspond with media content. For example, a scene in a movie may correspond to one subtitle entry, and the subtitle entry may have a subtitle range of 00:45:13-00:48:47, which is the time range of the movie scene. In this example rewind function 300, subtitle range 370 is positioned immediately after the event time 330, subtitle range 360 is positioned immediately before event time 330, and subtitle range 350 is positioned immediately before rewind time 340.

In some embodiments, the event that is selected for reversion (i.e., the event that corresponds with event time 330) may be the first event that is detected by a media player device during a particular playback of media content. In some embodiments, the event may be selected for reversion after a rewind command has been received. In some instances, the event selected for reversion may be selected from a plurality of recent events up to and including the most recent event. In some embodiments, an event may be selected based on determining the event that is estimated to cause the most significant disruption to a user. Once an event has been selected, a rewind command may be processed by referring to, or referencing, the subtitle entries to find the start of the previous sentence, or clause, or other section of speech marked by the subtitle's time stamp, that occurs at or before the event time 330. In some embodiments, this is done by finding a subtitle, or subtitle entry, with a start time before the event and reverting back to the start time of that subtitle entry.

Example events that may be considered to be potentially disruptive include:

a. Screen saver activation. In some embodiments, a screen saver may be an image or graphic that replaces the display after a time of inactivity on the display device. For example, a computer may go into sleep mode and activate a pre-set picture to display on the screen.

b. Audio detection of the user's voice. For example, if the user decides to make a telephone call during playback of the video, the microphone on the media player device can detect the user's voice.

c. Audio detection of ambient noise louder than a predefined threshold. For example, a system beep, telephone call, alarm, or other loud noise may occur during playback. The microphone on the media player device (or media player) may detect that the noise level is above a predefined threshold.

d. Viewing window of display device loses, or changes, focus. The viewing window may be a display screen, or a portion of a display screen that displays the media content. In some embodiments, the focus of a viewing window may be the most prominent display on the display device. For example, the focus of a viewing window may be a movie (i.e., the movie is the most prominent display on the viewing window). Continuing the example, a new message through an email or messaging application may arrive, causing the viewing window to display the email or messaging application. In this example, the display device, and the viewing window on the display device, changes focus from the movie to the email or messaging application.

e. Motion sensor (e.g. accelerometer) or other personal location detection (e.g. global positioning sensor). For example, if the user stands up and moves this may indicate an interruption event. This could be detected by movement of the media player device (e.g., the user moves a computer or tablet in order to stand up). It could be detected by a separation between the media player device and a user device (e.g., a smart watch worn by the user or mobile phone carried by the user). This may be detected, for example, by loss of near-field communication (e.g. loss of Bluetooth or WLAN connection), or by a motion sensor connected to one of the devices.

f. Muting of an attached or embedded speaker device, or a hardware device driver or operating system control utility.

g. An output of another application running on the media player device concurrently with the media player, such as in incoming call on a messaging application, or an alarm from a diary application.

In some embodiments, once an event has been selected as the revert target (e.g., an event corresponding to event time 330), the next step may be to determine what time to revert to (i.e., as illustrated in this figure, to determine the rewind time 340). In the embodiments associated with this illustration, the rewind function reverts back to rewind time 340, so that playback is resumed slightly before the time at which the disturbance, or interruption, occurred. However, in some embodiments, a rewind function may revert back to the time of the interrupt event (e.g., event time 330). The time, or location, for landing the reversion (i.e. the rewind time 340) may be determined with reference to the subtitle ranges 350, 360, and 370 and the corresponding subtitle entry.

The subtitle ranges 350, 360, and 370 are searched to locate a subtitle range, and a corresponding subtitle file or a corresponding portion of a subtitle file (e.g., subtitle entry), that has a start time shortly before the event time of a selected event. In the example implementation shown in FIG. 3, the located subtitle range (subtitle range 360) is the subtitle range with a start time that most closely precedes the event time of the selected event. FIG. 3 depicts the revert 325 from the end of the interrupt event (not pictured) to the rewind time 340.

Moreover, in the example implementation shown in FIG. 3, the rewind time 340 is set equal to the start time of the subtitle range 360. Optionally, a time decrement (e.g. a fixed or variable amount of time) could be subtracted from the start time of the subtitle range 360, so that the rewind time 340 is earlier than the start time by the decrement (e.g., 1 second, 5 seconds, 10 seconds).

Figure 4:
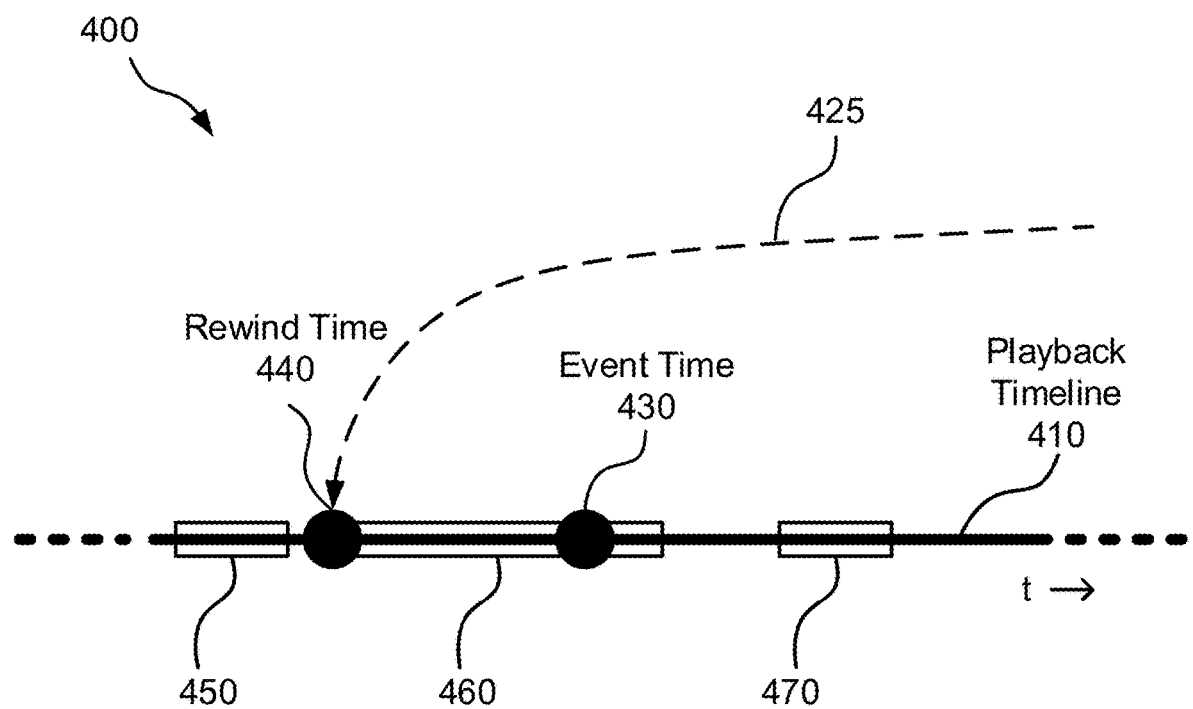
FIG. 4 depicts a schematic representation of an example revert action using an intelligent rewind function, according to some embodiments.

Referring to FIG. 4, a schematic representation of an example rewind function 400 is depicted, according to some embodiments. FIG. 4 shows a similar implementation to FIG. 3, but the subtitle range with a start time that most closely precedes the event time 430 of the selected event (i.e., subtitle range 460) has an end time after the event time 430, compared to subtitle range 360 (FIG. 3) that has an end time before the event time 330. In other words, event time 430 occurs within subtitle range 460, where, in FIG. 3, event time 330 occurred after subtitle range 360. FIG. 4 is another example implementation of a revert scenario. Rewind function 400 includes playback timeline 410, event time 430, and rewind time 440 (similar to rewind function 300 of FIG. 3). Subtitle range 470 occurs after event time 430. Event time 430 occurs during subtitle range 460, in this illustrated embodiment. In the illustrated embodiment, when the event time 430 occurs during subtitle range 460, the media content is rewound to, or reverted to, the beginning of subtitle range 460 (e.g., to rewind time 440).

In the example implementation shown in FIG. 4, the media content is depicted as reverting 425 from the end of (or after) the interrupt event (not shown) to the rewind time 440.

Figure 5:
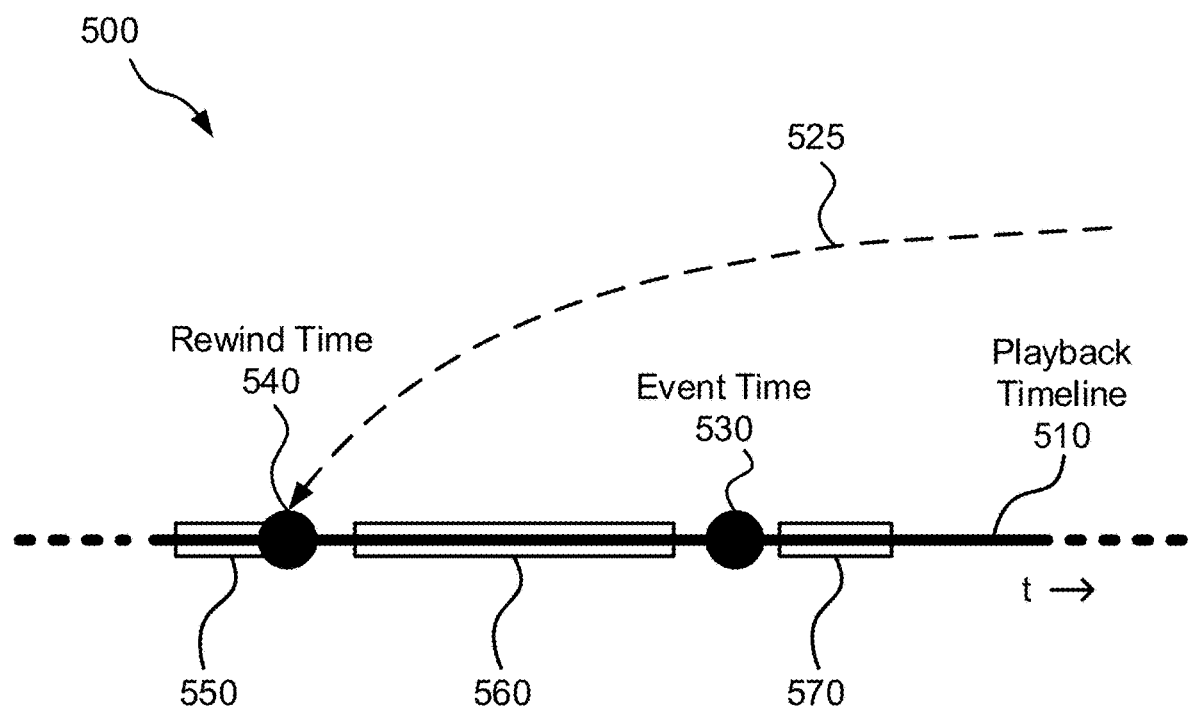
FIG. 5 depicts a schematic representation of an example revert action using an intelligent rewind function, according to some embodiments.

Referring to FIG. 5, a schematic representation of an example rewind function 500 is depicted, according to some embodiments. Rewind function 500 includes playback timeline 510, event time 530, and rewind time 540. FIG. 5 shows a different example implementation (compared to FIG. 3 and FIG. 4) in which the time for revert (i.e., rewind time 540) is the end time of a located subtitle range 550. The subtitle range 550 may be a subtitle range with a start time that is the second closest start time preceding event time 530 of the selected event. In this illustrated embodiment, subtitle range 560 has the first closest start time preceding event time 560 and subtitle range 550 has the second closest start time. In some embodiments, the rewind time 540 may be equal to the end time of the subtitle range 550. In some embodiments, a time increment (e.g. a fixed or variable amount of time) could be added to the end time of subtitle range 550, so that the rewind time 540 is later than the end time by the decrement.

In the example implementation shown in FIG. 5, the media content is depicted to revert 525 from the end of (or after) the interrupt event (not shown) to the rewind time 540.

Figure 6:
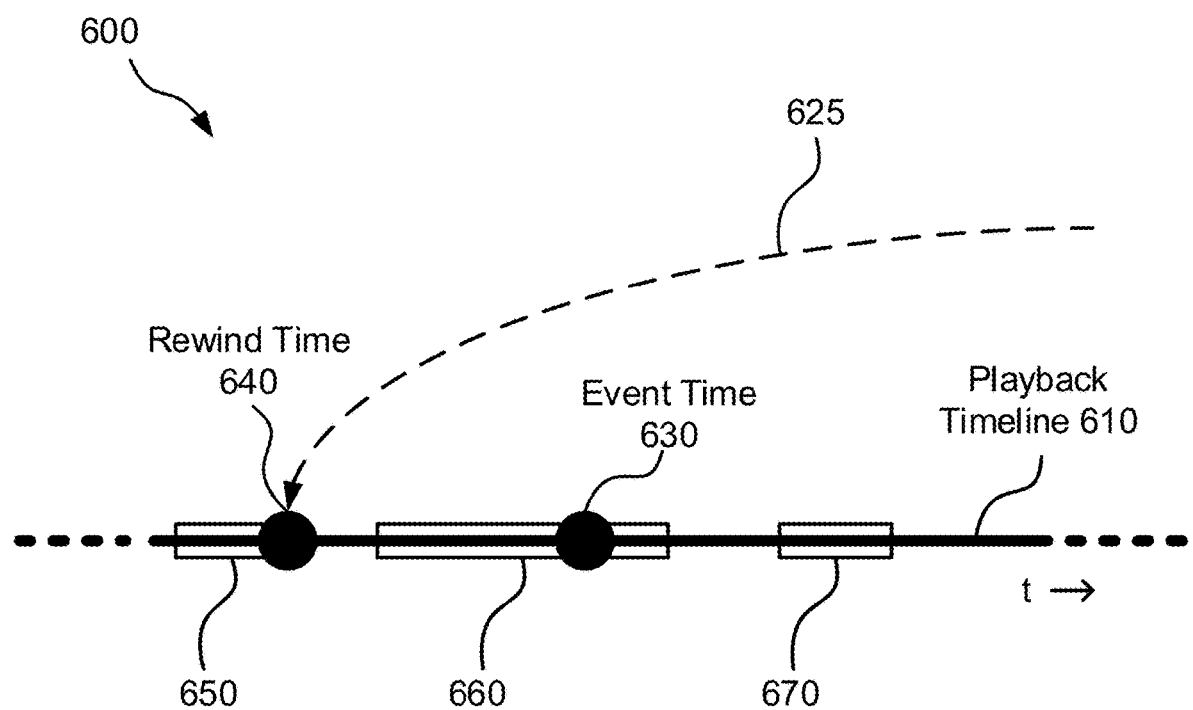
FIG. 6 depicts a schematic representation of an example revert action using an intelligent rewind function, according to some embodiments.

Referring to FIG. 6, a schematic representation of an example rewind function 600 is depicted, according to some embodiments. Rewind function 600 includes playback timeline 610, event time 630, rewind time 640, and subtitle ranges 650, 660, and 670. FIG. 6 shows a similar implementation to FIG. 5, but subtitle range 660 has an end time after the event time 630, compared to subtitle range 560 (FIG. 5) that has an end time before the event time 530. Other example implementations could be contemplated, such as a rewind time 640 referenced to the start time of subtitle range 650, etc.

In the example implementation shown in FIG. 6, the media content is depicted to revert 625 from the end of (or after) the interrupt event (not shown) to the rewind time 640.

After landing at the revert location, i.e. being moved back on the timeline to the rewind time 640, there are various options. In some embodiments, playback of the media content is automatically resumed, after landing at the revert location, or revert time, without further user input. In some embodiments, the media content is placed in a pause state from which the user may resume playback by actuating a play command, or issue a further rewind command, or a fast-forward command. For example, in some instances, the media player device may revert back to a time (e.g., rewind time 640) that is not far enough back for the liking of the user. In this example, the user may issue a further rewind command to revert the media content to a time that is satisfactory to the user. In another example, the media player device may revert back to a time that is too far back for the liking of the user. In this example, the user may issue a fast-forward command to advance to a time that is satisfactory to the user.

In some embodiments, once the further rewind command is issued, the rewind function can be applied again using the previously selected, or determined, events that are potentially disruptive to a user. For example, the media player device may have identified two events that were potentially disruptive to a user (i.e., two interrupt events) and may have reverted back to a more recent event time of the more recent interrupt event. In this example, the user may have stopped viewing the media content after the first interrupt event, and, after the user issues the further rewind command, the media player device reverts further to the first, or earlier, event time of the earlier interrupt event.

The further rewind command may be processed to cause a further revert to a location referenced by a notified event that occurred before the selected interrupt event. In some embodiments, the rewind time may correspond to the selected interrupt event, and the further rewind command may revert to a time that is earlier in time than the event time 630 of the interrupt event. In some embodiments, the earlier time may correspond to an adjacent subtitle range with a start time prior to the start of event time 630.

In some embodiments, a fast-forward command of the media player device may also adopt a similar process as the rewind command for determining its forward time, or forward location, compared to the determining the rewind time for the rewind command. For example, the fast-forward command may be processed to identify an event to move to (e.g., interrupt event), this event being later than the event reverted to most recently. It may be that no such event exists, in which case the fast-forward command may move to the time at which the most recent rewind command was issued. In some embodiments, when there is such an event to jump forward to, then the fast-forward command moves the media content forward to the forward time. In some embodiments, the forward time may correspond to a subtitle range, and the subtitle range may correspond to an event time of an event that occurred after the selected interrupt event, that was selected when processing the preceding rewind command.

As an aside, although the event time may be determined with reference to the subtitle entries, this does not mean that the subtitles are currently switched on for display. The method is applicable regardless of whether the subtitles are being shown by the media player (or media player device). That is to say, the media content being played may or may not include the subtitles, and this does not affect the operation of the intelligent rewind and fast-forward commands.

Figure 7:
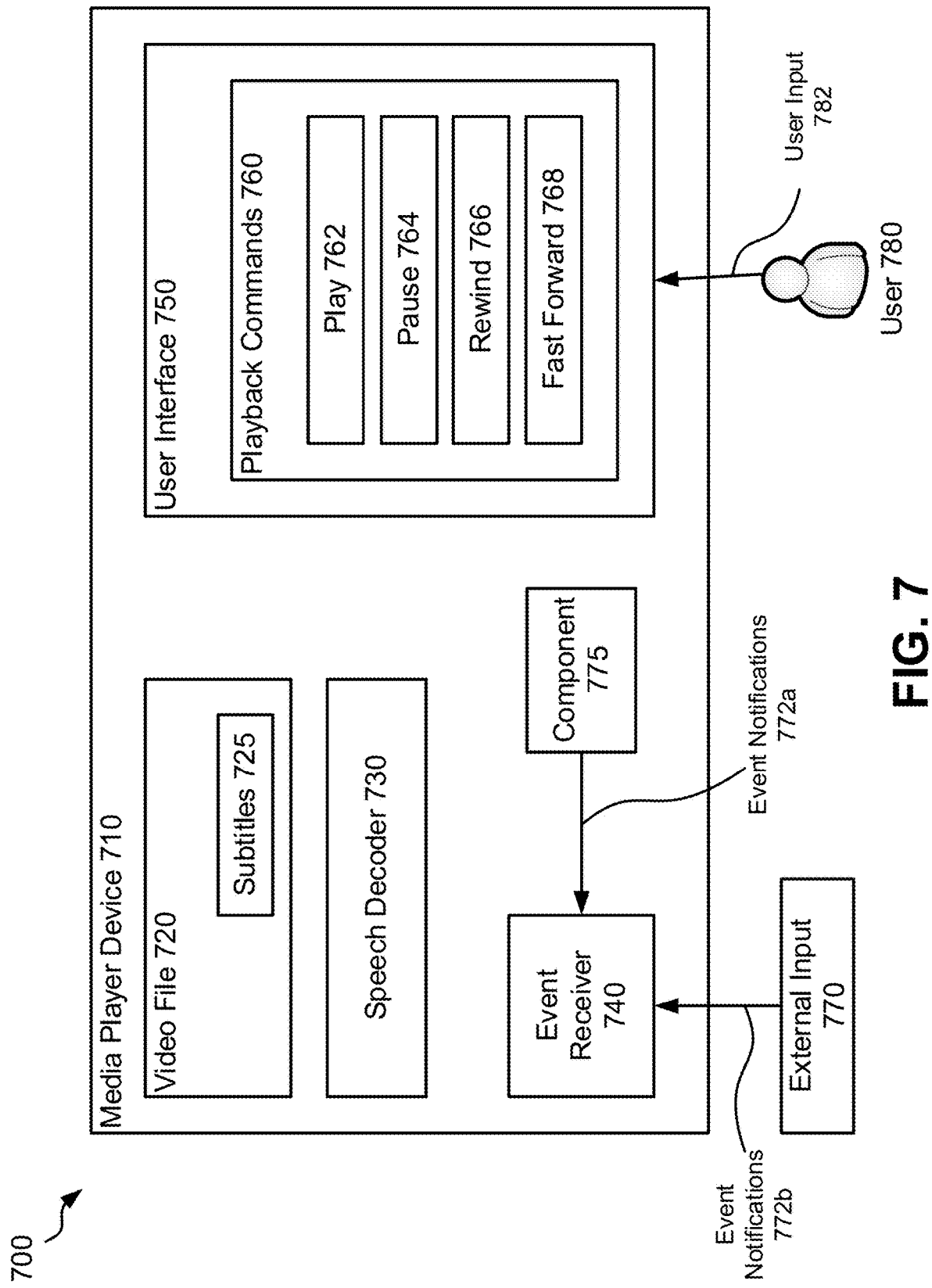
FIG. 7 depicts a block diagram of an example computer system for executing an intelligent rewind function, according to some embodiments.

Referring to FIG. 7, a block diagram of an example computer system 700 for executing an intelligent rewind function is depicted, according to some embodiments. Computer system 700 includes a schematic illustration of a media player device 710 for implementing the above-described rewind, and fast-forward, functions (e.g., rewind function 200 (FIG. 2), rewind function 300 (FIG. 3), rewind function 400 (FIG. 4), rewind function 500 (FIG. 5), rewind function 600 (FIG. 6)). Examples of media player device 710 include a smart television, a set-top box, a DVD player, a personal computer, a tablet or a smartphone, etc.

The media player device 710 may be operable to play back media content from a video file 720. The video file 720 may also contain subtitles 725. In some embodiments, the media player device may include a speech decoder 730 for generating subtitles 725 (e.g., while streaming video content from a video file 720, or live video footage being input to the media player device, e.g. from a television receiver). In some embodiments, the subtitles 725 are made up of a series of subtitle entries, each being displayable during playback for a time range having a start time and an end time. In some instances, media content may include a large amount of dialog (e.g., the dialog is dense), and the time ranges, or subtitle ranges, of the subtitle entries may overlap or nearly overlap (e.g., the end time of one subtitle range may be equal to or only slightly less than the start time of the next subtitle range). In some embodiments, the dialog of the media content may be sparse, and the time ranges, or subtitle ranges, of the subtitle entries may have significant gaps between them.

In some embodiments, the media player device 710 may include a user interface 750 via which a user 780 can input (e.g., user input 782) playback commands 760 including play 762, pause 764, rewind 766, and fast-forward 768. The user input 782 of commands may be through any suitable controls, for example a graphical user interface (GUI) of a touch screen or GUI of a personal computer using a cursor and pointing device, by voice commands, and/or by physical or virtual buttons on the media player device or another control device (such as a handheld remote controller). There may be multiple types of rewind 766 and fast-forward 768 commands (e.g., one for jumping forward and back by whole scenes, another for rewinding at set speeds (e.g., 2×, 4×, 8×, 16× etc.) and another for moving back and forward to rewind times determined by a combination of the times of interrupt events and their relative position in the timeline to preceding subtitle windows). It is also possible that a media player device 710, for a rewind or fast-forward button actuation, or other input, may decide which type of rewind 766 or fast-forward 768 command to perform.

The media player device 710 includes an event receiver 740 for receiving notifications of events (e.g., event notifications 772*a* and 772*b*) that may occur during playback of the media content, which are potentially disruptive to viewing the video content, each notification occurring at a particular time referred to as an event time. The event notifications may be from an external input 770 to the media player device 710 (and/or the event receiver 740 within the media player device 710) and/or generated internally by some component 775 of the media player device 710.

Figure 8:
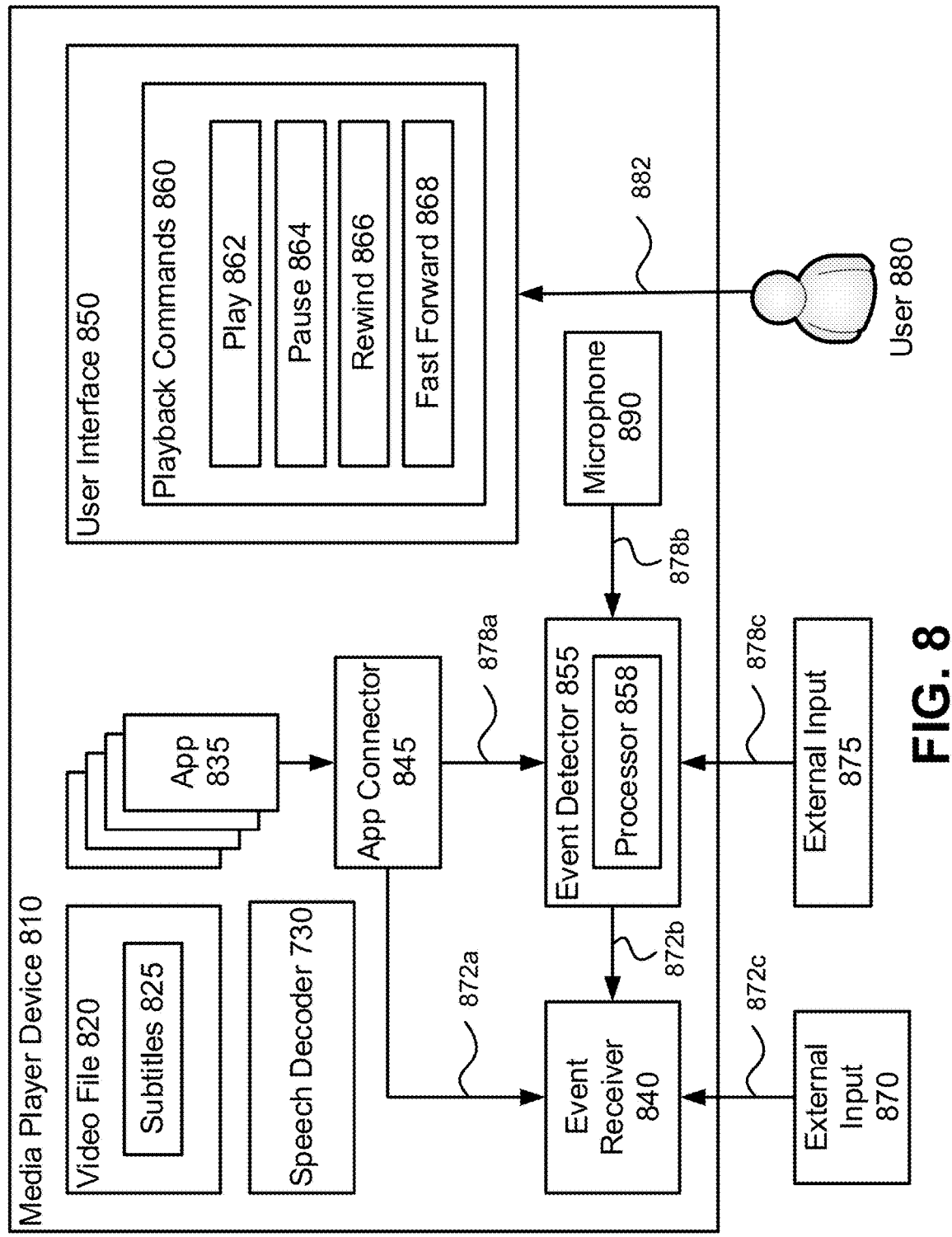
FIG. 8 depicts a block diagram of an example computer system for executing an intelligent rewind function, according to some embodiments.

Referring to FIG. 8, a block diagram of an example computer system 800 for executing an intelligent rewind function is depicted, according to some embodiments. Computer system 800 includes a schematic illustration of an example media player device 810 for implementing the above-described rewind functions, similar to media player device 710 (FIG. 7). Examples of media player device 810 include a smart television, a set-top box, a DVD player, a personal computer, a tablet or a smartphone, etc.

In some embodiments, media player device 810 is operable to play back media content from a video file 820. The video file may also contain subtitles 825. In some embodiments, media player device 810 may have a speech decoder 730 for generating subtitles 825.

In some embodiments, the media player device 810 may include a user interface 850 via which a user 880 can input (e.g., user input 882) playback commands 860 (e.g., user-actuatable commands) including play 862, pause 864, rewind 866, and fast-forward 868.

The media player device 810 may include an event receiver 840 for receiving notifications of events (e.g., event notifications 872*a*, 872*b*, and 872*c*) that occur during playback of the media content by the media player 830, which are potentially disruptive to viewing the video content, each notification occurring at a particular time referred to as an event time. The event notifications 872*a*, 872*b*, and 872*c* may be from an external input 870 to the media player device 810 (and/or the event receiver 840 within the media player device 810) and/or generated internally by some component of the media player device 810.

In some embodiments, the media player device 810 includes an event detector 855 with respective inputs for receiving event data (e.g., event data 878*a*, event data 878*b*, and event data 878*c*) internally and/or externally. The event detector 855 includes a processor 858 which may be operable to process the event data 878*a*, 878*b*, and 878*c* in order to identify events that are potentially disruptive to the user 880. Such events (e.g., interrupt events, selected events, etc.), may be output to the event receiver 840 via event notifications 872*b*.

One example of a component for generating event data 878*b* is a microphone 890 which may output event data 878*b* in audio form. FIG. 8 shows the media player device 810 having an inbuilt, i.e. internal, microphone 890 to supply a stream of audio event data 878*b* to the event detector 855. In some embodiments, the event detector 855 may be connected to an external microphone and receive audio event data from an associated input. The audio event data from the microphone may pick up noise in the vicinity of the microphone, so the microphone can pick up the raw data for determining notifiable events such as the doorbell ringing, a telephone ringing (which may be a third party device or the media player device), conversation taking place and so forth.

The media player device 810 may have an operating system which allows application 835 to run, or multiple applications (apps) 835 to run simultaneously. In some embodiments, application(s) 835 run on an external device, such as a display device, that is connected to the media player device 810. In some embodiments, the connection may be direct (e.g., through a cable such as an ethernet cable, USB cable, serial and/or parallel cable, etc.). In some embodiments, the connection may be indirect (e.g., through a central fixture such as an ethernet router, a USB interface, etc.). In some embodiments, the connection may be wireless (e.g., through a wireless network such as the internet, Internet of Things (IoT), cloud computing, etc.). FIG. 8 schematically shows four apps 835 running simultaneously. The media player device 810 may include an application connector 845 which is in communication with the applications 835 that are running on the media player device 810. The application connector 845 may be configured to sense certain types of output from the applications 835 and generate event data 878*a* and/or event notifications 872*a* from those outputs. For example, an incoming call on a messaging application would cause the application connector 845 to generate an event notification 872*a*, whereas user inputs to a word processing application would cause the application connector 845 to generate a stream of event data 878*a*. The application connecter 845 then outputs the event data 878*a* to the event detector 855 and event notifications 872*a* to the event receiver 840.

The event detector 855 and event receiver 840 may listen, (e.g., via microphones 890 and/or over wireless connections, etc.) for incoming notifications from other devices which may be alerting to a notifiable event (e.g. phone ringing, text message, email notification, weather update).

Figure 9:
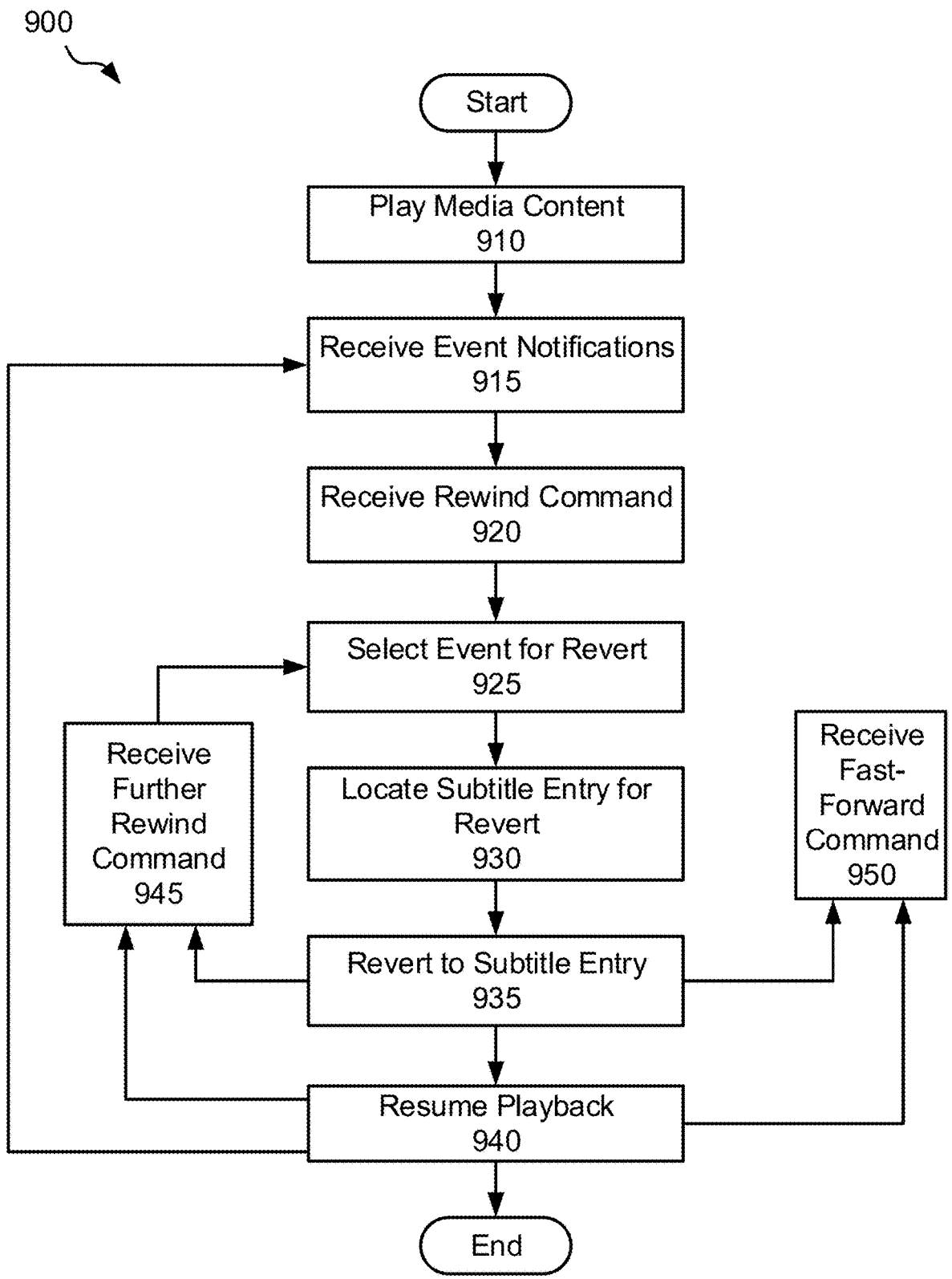
FIG. 9 depicts a flowchart of a set of operations for executing an intelligent rewind function, according to some embodiments.

Referring to FIG. 9, a flowchart of a method 900 for executing an intelligent rewind function is depicted, according to some embodiments. In some embodiments, a media player device is configured to execute operation 910 to play media content. Media content, such as a video, may be played from a video file, for example from the start of a timeline of the video (i.e., at time zero), although the video file could be started at any point in the timeline.

In some embodiments, a media player device is configured to execute operation 915 to receive event notifications. In some embodiments, during playback, event notifications of events that are deemed to be potentially disruptive to viewing the video content are generated. Initially, these notifications may not be acted upon, or at least immediately acted upon. Each notification may occur at a particular time, referred to as an event time. In some implementations, a log of notified events can be kept. The log may store all notified events or, for example, the most recent events, (e.g. a fixed number of recent events, such as events 2, 3, 4 or 5 of the most recent events) or all events that have occurred over a fixed time span from the current playback time (e.g. 1, 2, 3, 4, 5, 10, 15 or 20 minutes). In some embodiments, the log thus forms a record of each notified event relative to the playback time on the timeline of the video. In some embodiments, only one notified event is stored. This could be the most recent notified event. In some embodiments, the media player device ranks notified events by significance and stores the notified events based on ranking. In some embodiments, the notification(s) are immediately acted upon.

In some embodiments, a media player device is configured to execute operation 920, to receive a rewind command. In some embodiments, the rewind command is received from a user (e.g., viewer of the media content). In some embodiments, the media player device detects an ending of an interrupt event and internally issues a rewind command.

In some embodiments, a media player device is configured to execute operation 925 to select an event for reverting (e.g., select an interrupt event from the notified events). In some embodiments, the rewind command is acted on by selecting a notified event as the revert target. In some embodiments, an event is selected for reversion, or an interrupt event is identified, before a rewind command is received. In some instances, an event notification may be received and immediately acted upon, and the event corresponding to the notification may be selected as the event for revert (or the interrupt event), which may occur before a rewind command has been received.

In some embodiments, a media player device is configured to execute operation 930 to locate a subtitle range for reverting. In some embodiments, the media player device may locate a subtitle range, and the corresponding subtitle entry, with reference to the event time associated with the notified event selected as the revert target (i.e., interrupt event).

In some embodiments, a media player device is configured to execute operation 935, to revert to the located subtitle range. In some embodiments, the playback position on the timeline is reverted to a location corresponding to the located subtitle range (e.g., 5 seconds before the start time of that subtitle range).

In some embodiments, a media player device is configured to execute operation 940, to resume playback, such that playback is resumed from the revert location. In some embodiments, playback is automatically resumed without further user input. In some embodiments, after reverting, the media player device may be placed in a pause state, from which the user may actuate a play command in order to resume playback. In some embodiments, the media player device may continuously perform rewind functions, and may continuously be determining interrupt events during the playback of the media content. In these embodiments, after operation 940, playback may proceed and method 900 returns to operation 915 in order to receive additional event notifications. In some embodiments, after performing a rewind command as described, any event log may optionally be wiped clean (i.e., its event entries may be deleted).

In some embodiments, a further rewind command may be received (operation 945) after playback has been resumed (operation 940). For example, a movie may have been reverted and play may have been resumed, but the revert, or rewind, time may not be satisfactory to the user, so the user may issue a further rewind command to revert further. In some embodiments, a further rewind command may be received (operation 945) before playback has been resumed (operation 940). For example, a movie may have been reverted, but the movie may remain on pause such that playback has not resumed. In this example, while the movie is paused, a user may issue a further rewind command. When a further rewind command is received, a further revert may be performed (e.g., method 900 may proceed to operation 925 from operation 945 to select an event for revert back). In some embodiments, the event for reverting (after the received further rewind command) may correspond to a notified event that occurred before the interrupt event selected in the preceding rewind command. In some embodiments, the amount of time after resumption of playback over which a further rewind command is processed is limited in some way (e.g. to a fixed amount of time after resumption (e.g., 1, 2, 3, 4, 5 or 10 seconds), or for a certain number of subtitle entries (e.g., only allowing 1, 2, 3, 4 or 5 subtitle entries to be encountered or traversed before deactivating this functionality). In this way the user may be able to rewind successively to convenient points in the timeline each defined by one of a series of notified events.

In some embodiments, operation 950 shows another optional feature of the media player device, which is to receive/process fast-forward commands (e.g., after reverting). In some embodiments, a fast-forward command may be received after playback has resumed in operation 940. In some embodiments, a fast-forward command may be received before playback has resumed in operation 940 (for example, while the media content remains paused after the reversion has occurred). In some embodiments, a fast-forward command is received in order to execute a fast-forward jump (further described in FIG. 10).

Figure 10:
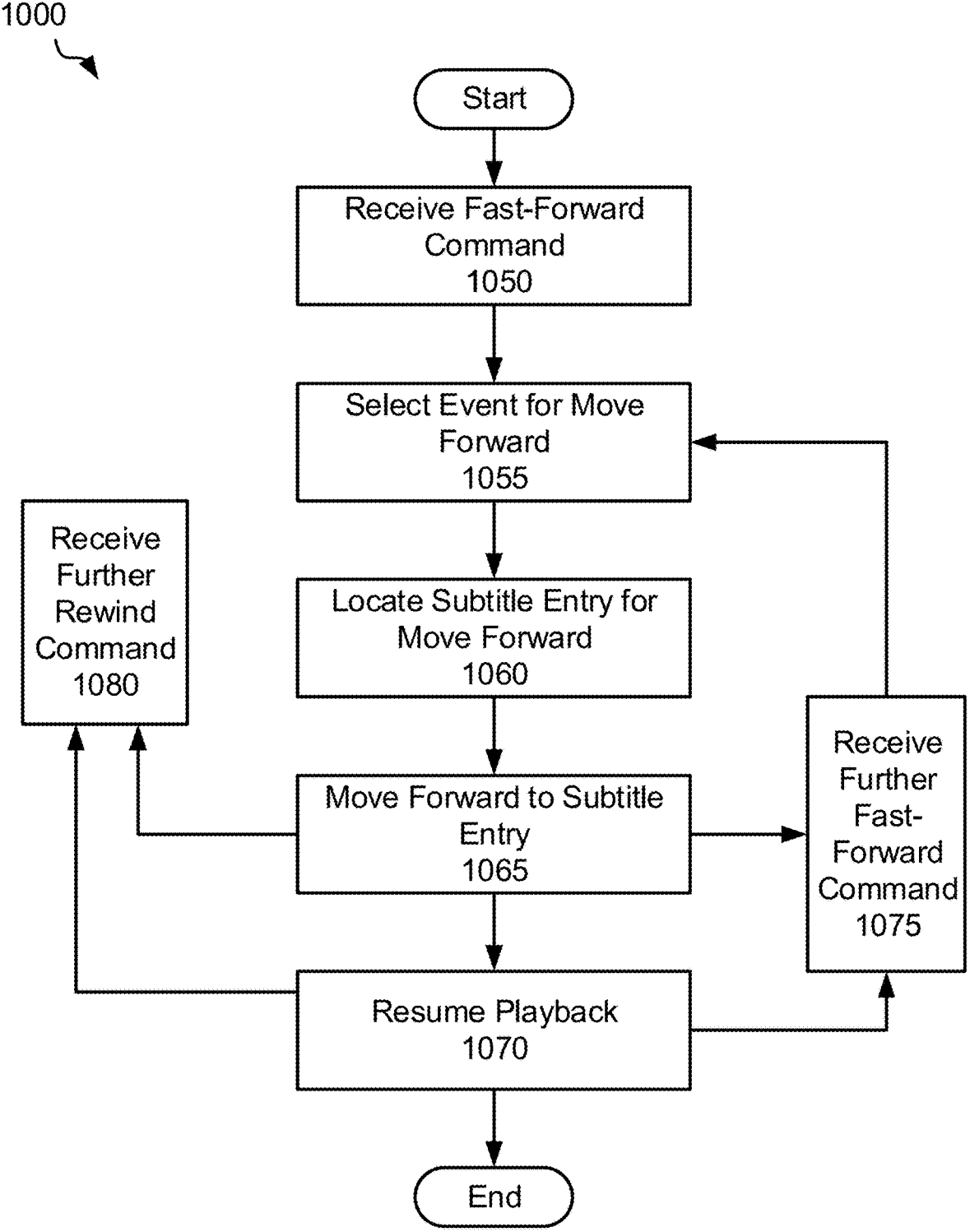
FIG. 10 depicts a flowchart of a set of operations for executing an intelligent fast-forward function, according to some embodiments.

Referring to FIG. 10, a flowchart of a method 1000 for executing an intelligent fast-forward function is depicted, according to some embodiments. In some embodiments, a media player device is configured to execute operation 1050 to receive a fast-forward command. In some embodiments, operation 1050 corresponds to, or is the same as, operation 950 of FIG. 9. The fast-forward command, when actuated after a rewind command or similar fast-forward command, can advance the media content to a location corresponding to a subtitle range. The location corresponding to a subtitle range may be located with reference to an event time of an event that occurred after the event selected when processing the preceding rewind command, provided that such an event exists. In some embodiments, the time limitation for this functionality can be set in the same way as described for the rewind command.

In some embodiments, a media player device is configured to execute operation 1055 to select an event for moving forward. For example, after the fast-forward command is received in operation 1050, an event to target (sometimes referred to herein as the "forward event") for the advancement is selected.

In some embodiments, a media player device is configured to execute operation 1060 to locate a subtitle range for the advancement. Similar to the rewind command, the subtitle range may be a time range that corresponds to a subtitle entry and has a start time earlier than the start of the event time of the selected event. Other options and comments regarding determination of the rewind time described above for the rewind command may also apply to the forward time and the fast-forward command.

In some embodiments, a media player device is configured to execute operation 1065 to advance to the selected (or located) subtitle range. In some embodiments, the advancement may move the playback location to the point in time decided on with reference to the located subtitle range (e.g., its start time). The advancement may be executed in a similar way as the reversion discussed herein (e.g., in connection to FIG. 9).

In some embodiments, a media player device is configured to execute operation 1070 to resume playback. Operation 1070 may be the same as, or substantially similar to, operation 940 (FIG. 9).

The illustrated process flow in FIG. 10 also shows, with operation 1075, the route taken when a subsequent fast-forward command is received at or shortly after playback resumption after advancement. In some embodiments, after the advancement of operation 1065, but before resuming playback (operation 1070), a further fast-forward command may be received (e.g., while the media content remains paused after the advancement). In some embodiments, method 1000 may resumes playback in operation 1070 before the further fast-forward command is received in operation 1070 (e.g., after the media content has resumed playback). In some embodiments, after moving forward, a further rewind command may be received in operation 1080. In some embodiments, the further rewind command may be received before the media content resumes playback in operation 1070. In some embodiments, the further rewind command may be received after playback has resumed in operation 1070.

Figure 11:
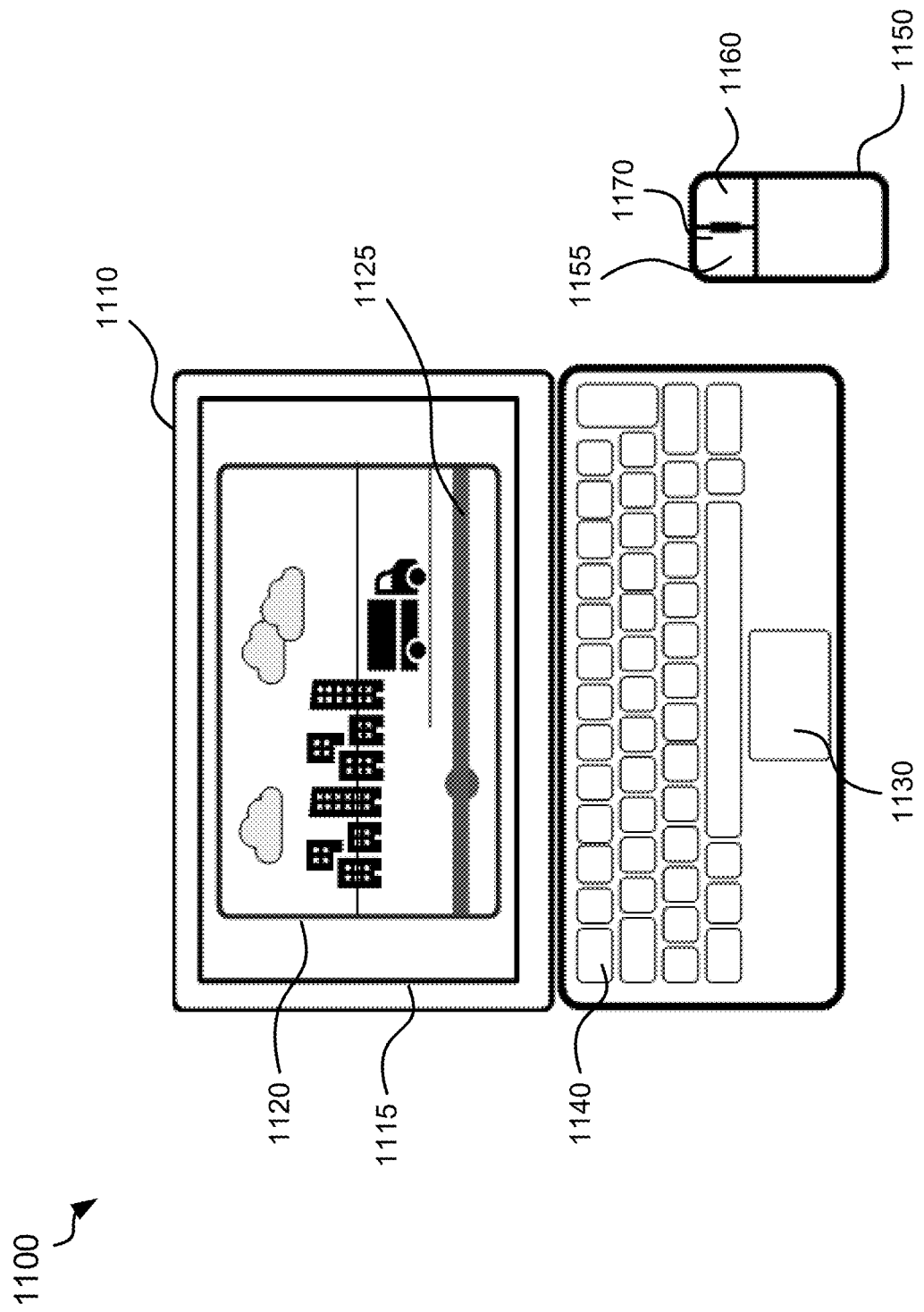
FIG. 11 depicts a schematic diagram of an example media player device, according to some embodiments.

Referring to FIG. 11, a schematic diagram of an example media player device 1100 is depicted, according to some embodiments. In some embodiments, device 1100 may be a display device connected to a media player device (for example, by a wireless connection). In this illustration, media player device 1100 may be a client computer 1110 in a laptop format with an inbuilt monitor 1115 housing a display screen. The client computer 1110 may have an operating system which incorporates support for a graphical user interface (GUI) that, for example, may include a cursor. The display screen is shown displaying the GUI 1120 of a media player including a timeline 1125 which proceeds from left to right and is currently playing back at the location indicated by the blob on the timeline 1125. The cursor's position and motion may be controllable by a user-driven I/O device, the user-driven I/O device may be generically referred to as a pointing device. The client computer 1110 is connected to a pointing device in the form of a mouse 1150 including a left button 1155, a right button 1160, and a scroll wheel 1170. Of course, further buttons and input elements may also be included, such as in a mouse designed or configured for gaming or other specific application types. The client computer 1110 also has an inbuilt pointing device in the form of a trackpad 1130. The computer 1110 may further include an inbuilt keyboard 1140. The keyboard 1140, mouse 1150, and trackpad 1130 are examples of I/O devices. In some embodiments, I/O device is a device that is communicatively connected to control elements of the client computer 1110, such as its central processing unit (CPU) or graphics processing unit (GPU). In some embodiments, in the case that the laptop display (i.e., client computer 1110 display) includes an overlaid touch sensor, then the touch sensor will constitute a further I/O device, which can also function as a pointing device. The keyboard 1140 may include a plurality of keys, e.g. following a standard QWERTY layout and space bar, with other standard keys such as ENTER, CAPS LOCK, ALT, CTRL, FN and so forth also being provided.

Figure 12:
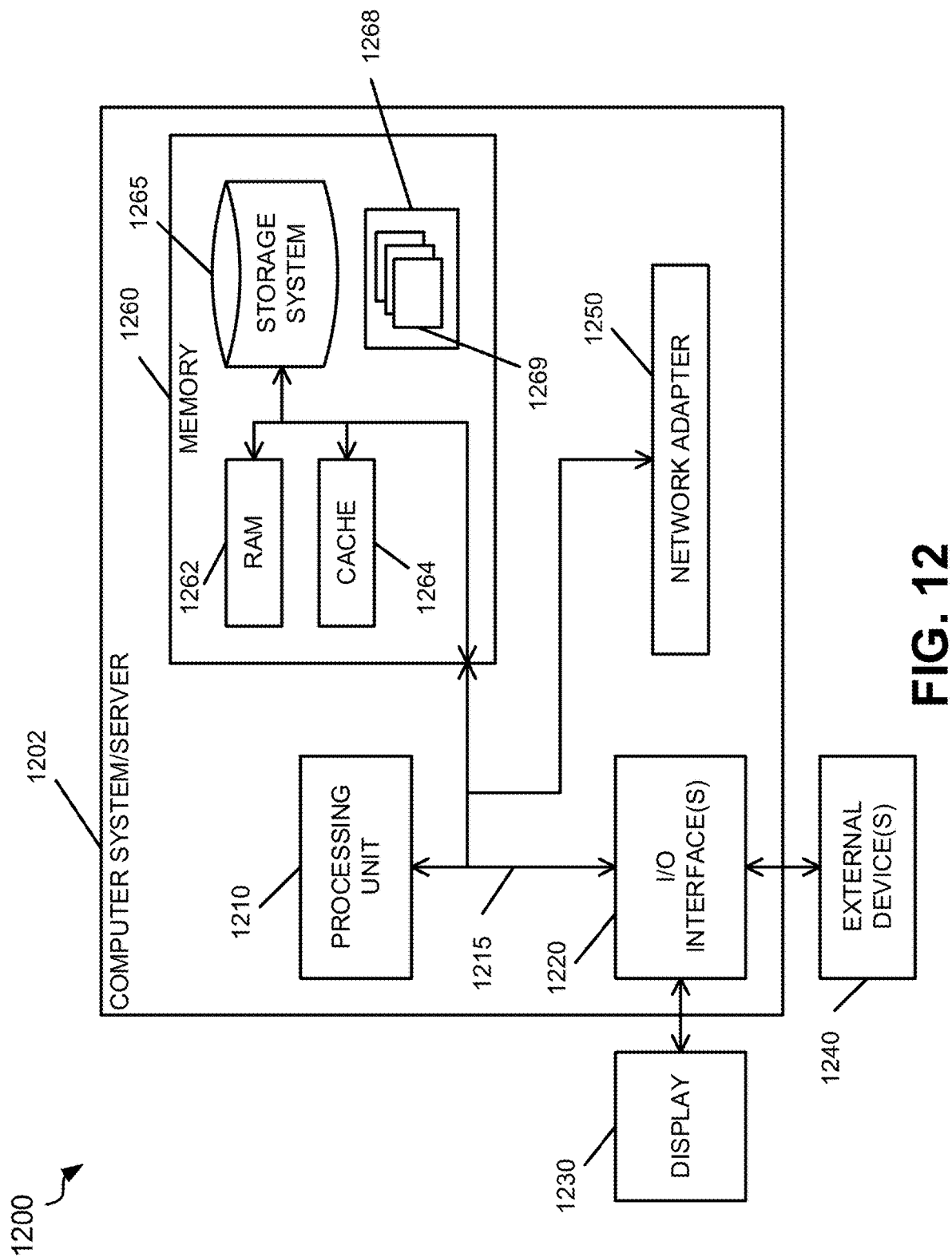
FIG. 12 depicts a block diagram of a sample computer system for executing an intelligent rewind function, according to some embodiments.

Referring to FIG. 12, a block diagram of a sample computer system 1200 for executing an intelligent rewind function is depicted, according to some embodiments. Computer system 1200 is a computer system/server 1202 is shown in the form of a general-purpose computing device, according to some embodiments. In some embodiments, computer system/server 1202 may be client computer 1110 (FIG. 11). The components of computer system/server 1202 may include, but are not limited to, one or more processors or processing units 1210, a system memory 1260, and a bus 1215 that couple various system components including system memory 1260 to processor 1210.

Bus 1215 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1260 can include computer system readable media in the form of volatile memory, such as random access memory (RAM) 1262 and/or cache memory 1264. Computer system/server 1202 may further include other removable/non-removable, volatile/non-volatile computer system storage media. By way of example only, storage system 1265 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1215 by one or more data media interfaces. As will be further depicted and described below, memory 1260 may include at least one program product having a set (e.g., at least one) of program modules that are configured to carry out the functions of embodiments of the invention.

Program/utility 1268, having a set (at least one) of program modules 1269, may be stored in memory 1260 by way of example, and not limitation, as well as an operating system, one or more application programs, other program modules, and program data. Each of the operating system, one or more application programs, other program modules, and program data or some combination thereof, may include an implementation of a networking environment. Program modules 1269 generally carry out the functions and/or methodologies of embodiments of the invention as described herein.

Computer system/server 1202 may also communicate with one or more external devices 1240 such as a keyboard, a pointing device, a display 1230, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1220. Still yet, computer system/server 1202 can communicate with one or more networks such as a local area network (LAN), a general wide area network (WAN), and/or a public network (e.g., the Internet) via network adapter 1250. As depicted, network adapter 1250 communicates with the other components of computer system/server 1202 via bus 1215. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
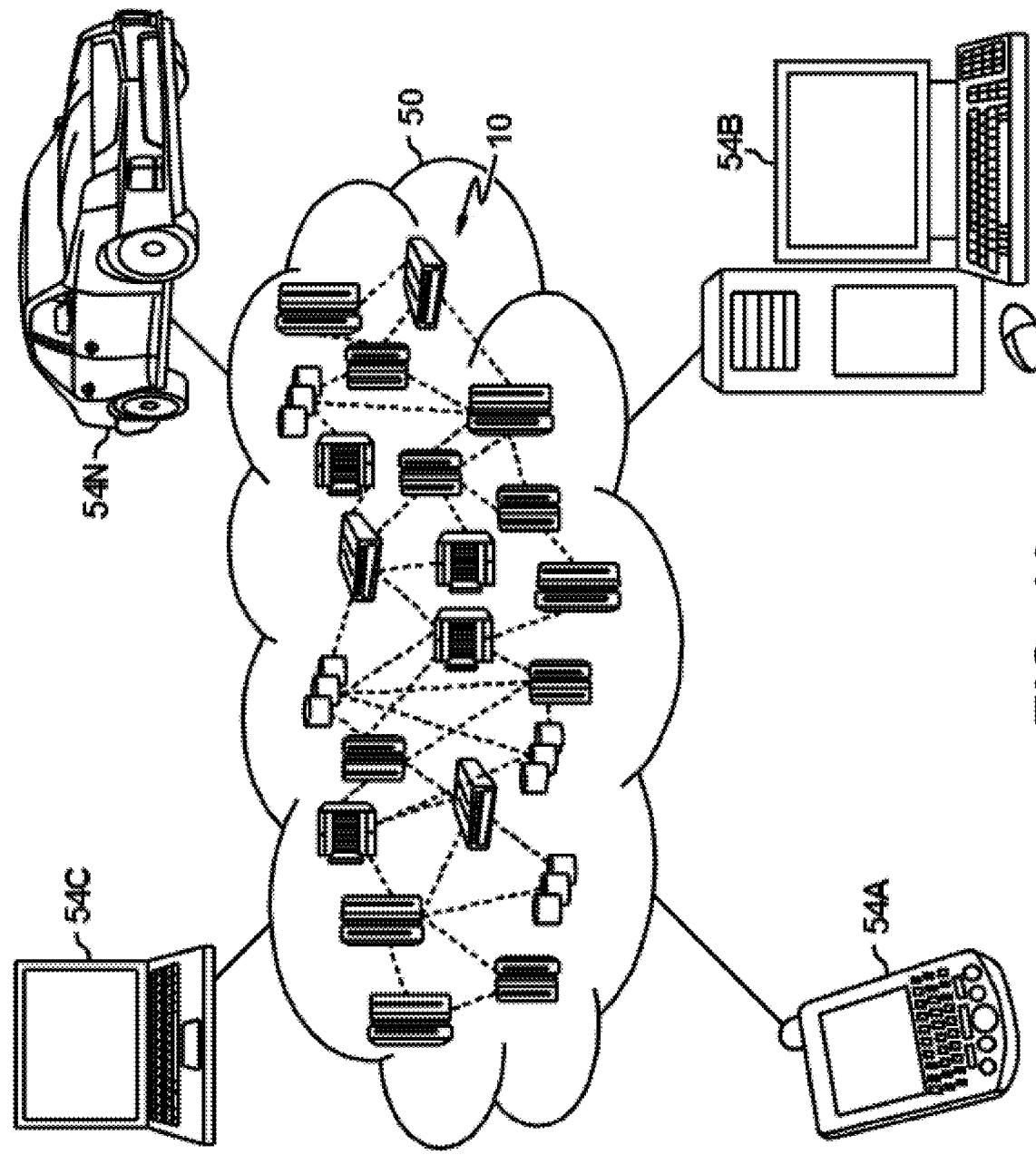
FIG. 13 depicts a cloud computing environment, according to some embodiments.

Referring now to FIG. 13, illustrative cloud computing environment 1300 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
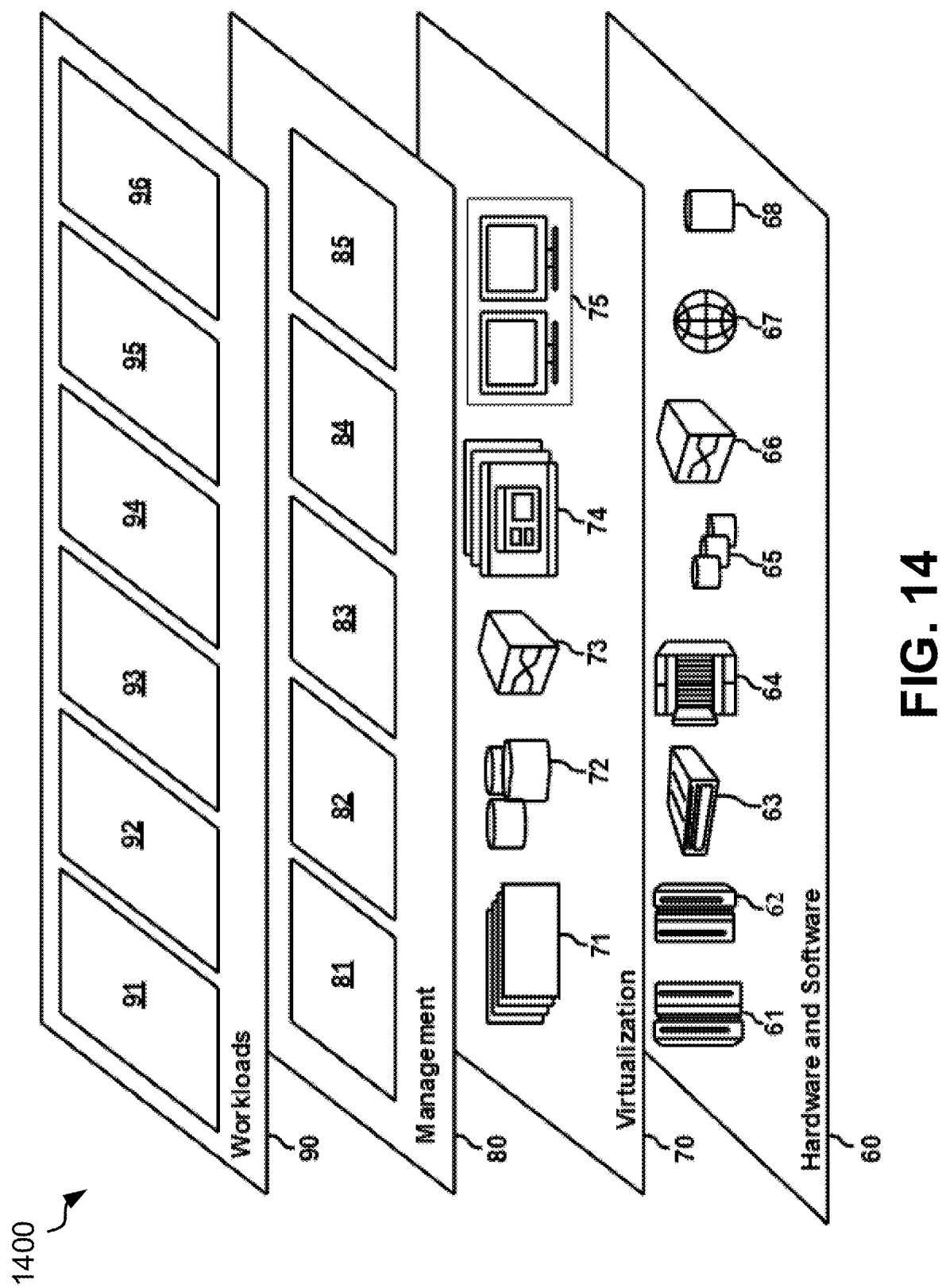
FIG. 14 depicts abstraction model layers, according to some embodiments.

Referring now to FIG. 14, a set of functional abstraction layers 1400 provided by cloud computing environment 50 (FIG. 13) is shown, according to some embodiments. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media content processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying one or more events that occur during playback of media content;
identifying an interrupt event in the one or more events, wherein the interrupt event is an event that is estimated to be disruptive to a user consuming the media content;
locating an event time on a timeline of the media content, wherein the event time is a time of the interrupt event;
identifying content of a previous subtitle entry immediately preceding the event time;

determining a rewind time in the timeline based on the content of the previous subtitle entry immediately preceding the event time, wherein the rewind time is at a start of a previous sentence of the previous subtitle entry, the previous subtitle entry comprising a plurality of subtitles; and reverting the media content to the rewind time.

2. The method of claim 1, wherein the rewind time is the event time.

3. The method of claim 1, wherein the media content includes subtitle files, wherein the subtitle files comprise one or more subtitle entries.

4. The method of claim 3, further comprising:
in response to locating the event time, locating one or more subtitle entries with subtitle ranges near the event time;
determining a subtitle entry with a start time before the event time; and
wherein the rewind time corresponds to the subtitle entry.

5. The method of claim 4, wherein the rewind time is the start time of the subtitle entry.

6. The method of claim 4, wherein the rewind time is a time preceding the start time of the subtitle entry.

7. The method of claim 4, wherein:
the subtitle entry has an end time before the event time, and the rewind time is the end time of the subtitle entry.

8. The method of claim 1, wherein identifying the interrupt event is in response to receiving a rewind command.

9. The method of claim 1, wherein the one or more events are audio events.

10. The method of claim 9, wherein identifying the one or more events comprises:
detecting an increased amount of noise; and
identifying the increased amount of noise as an event.

11. The method of claim 10, wherein detecting the increased amount of noise includes detecting a noise level above a predefined threshold level.

12. The method of claim 1, wherein identifying the one or more events comprises: determining that a viewing window of the media content changes focus.

13. A system having one or more computer processors, the system configured to:
identify one or more events that occur during playback of media content;
identify an interrupt event in the one or more events, wherein the interrupt event is an event that is estimated to be disruptive to a user consuming the media content;
locate an event time on a timeline of the media content, wherein the event time is a time of the interrupt event;
identify content of a previous subtitle entry immediately preceding the event time;
determine a rewind time in the timeline based on the content of the previous subtitle entry immediately preceding the event time, wherein the rewind time is at a start of a previous sentence of the previous subtitle entry, the previous subtitle entry comprising a plurality of subtitles; and
automatically revert the media content to the rewind time without user input.

14. The system of claim 13, wherein the rewind time is the event time.

15. The system of claim 13, wherein the media content includes subtitle files, wherein the subtitle files comprise one or more subtitle entries.

16. The system of claim 15, wherein the system is further configured to:
in response to locating the event time, locate one or more subtitle entries with subtitle ranges near the event time;
determine a subtitle entry with a start time before the event time; and wherein the rewind time corresponds to the subtitle entry.

17. The system of claim 16, wherein:
the subtitle entry has an end time before the event time, and
the rewind time is the end time of the subtitle entry.

18. A computer program product comprising a non-transitory computer readable storage medium having program instructions embodied therewith, the program instructions executable by a processor of a second computing device to cause the second computing device to perform a method comprising:
identifying one or more events that occur during playback of media content;
identifying an interrupt event in the one or more events, wherein the interrupt event is an event that is estimated to be disruptive to a user consuming the media content;
locating an event time on a timeline of the media content, wherein the event time is a time of the interrupt event;
identifying content of a previous subtitle entry immediately preceding the event time;
determining a rewind time in the timeline based on the content of the previous subtitle entry immediately preceding the event time, wherein the rewind time is at a start of a previous sentence of the previous subtitle entry, the previous subtitle entry comprising a plurality of subtitles; and
reverting the media content to the rewind time in the timeline.

19. The computer program product of claim 18, wherein the media content includes subtitle files, wherein the subtitle files comprise one or more subtitle entries.

20. The computer program product of claim 19, further comprising:
in response to locating the event time, locating one or more subtitle entries with subtitle ranges near the event time;
determining a subtitle entry with a start time before the event time; and
wherein the rewind time corresponds to the subtitle entry.

* * * * *